United States Patent Office.

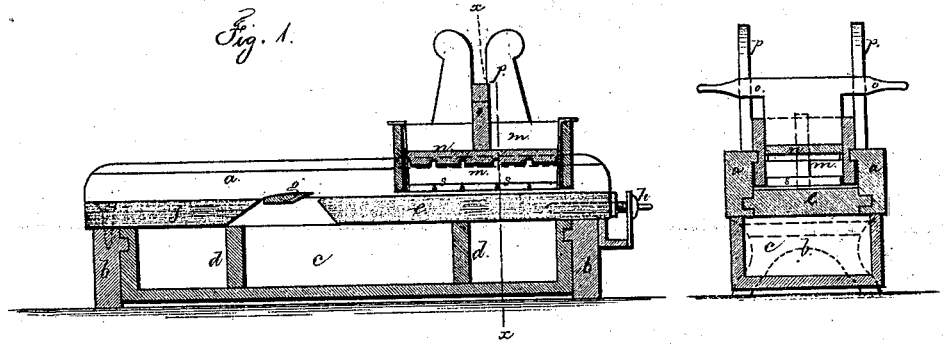

FRANCISQUE MONNET, OF NEW YORK, N. Y.

Letters Patent No. 113,188, dated March 28, 1871.

IMPROVEMENT IN VEGETABLE-CUTTERS.

The Schedule referred to in these Letters Patent and making part of the same.

*To all whom it may concern:*

Be it known that I, FRANCISQUE MONNET, of the city and State of New York, have invented an Improvement in Vegetable-Cutters; and the following is declared to be a correct description of the same.

Knives have been placed in a trough and made adjustable, so that slices of greater or lesser thickness can be cut from vegetables moved back and forth in said trough.

My invention consists in combining, with the trough and knife, means for subdividing the slices of vegetable substances, so that, instead of the said vegetable substances being delivered in the form of thin slices, they are delivered in small strips.

In the drawing—

Figure 1 is a longitudinal section of my vegetable-cutter;

Figure 2 is a cross-section at the line $x\ x$;

Figure 3 is a plan of the trough;

Figure 4 is a plan of the vegetable-holder, detached; and

Figures 5 and 6 are longitudinal and transverse sections of cutting-tubes for producing round strips of the vegetable substances.

The trough is made of side pieces $a\ a$, upon suitable end pieces or legs $b\ b$, and a drawer, $c$, is provided for receiving the cut vegetable; and this may have divisions, $d\ d$, within it, the same being slipped into grooves so as to be removable.

The side pieces $a\ a$ of the trough form slides for the reception of the bottom portion $e\ f$ of said trough.

The knife $g$ is connected with the bottom portion $f$, and the other portion, $e$, is adjustable by the screw $h$, so as to move it endwise and give a greater or lesser width of opening for the slice of vegetable material cut by the knife $g$.

The end of the bottom $e$ adjacent to the knife $g$ may be either plain or made with projecting lance-formed cutters. When these lance-formed cutters are introduced, as seen at $i\ i$, fig. 3, the vegetable material is divided by longitudinal incisions, and delivered in strips of a width corresponding to the distances between the lance-formed cutters $i\ i$. I, however, lay no claim to the knives shown in figs. 1, 2, and 3, as they are only represented in connection with my improved box, hereafter described, for holding the material to be cut.

My improved knife $g$ is made as a series of tubes, as represented in figs. 5 and 6. The vegetable material will be cut up into round strips and intervening segmental strips.

The construction of trough shown allows for removing one knife and inserting the other, the box for holding the material to be cut being available with either form of knife.

The vegetable material is contained in the holder or box $m$, that is fitted to slide between the sides $a\ a$ of the trough, and the follower $n$ is employed to hold and press down such vegetable material.

The center-piece and handles $o\ o$, rising above said follower $n$, and passing between the standards $p$, give a convenient means for reciprocating the holder $m$ and simultaneously pressing the vegetable material down to the knife, and thereby risk of cutting the fingers is avoided.

In order to divide up the vegetable material transversely into lengths I make use of a frame of knives, $s$, suspended in the box $m$, just above the knife $g$, by the hooks $r$; and the transverse knives in this frame are made with the cutting-edges at the top so as to separate the vegetable material as pressed upon them. These knives also aid in holding the material while being cut by the knife $g$.

I claim as my invention—

1. The tubular knives $g$, shown in figs. 5 and 6, in combination with the holder $m$, for vegetable substances, sustained in the slides $a$, and reciprocated, as set forth.

2. The frame of knives $s$, within the box $m$, to separate the vegetable material, in combination with the follower $n$ and knife $g$, for the purposes set forth.

Dated October 13, A. D. 1870.

MONNET, FRANCISQUE.

Witnesses:
GEO. D. WALKER,
GEO. T. PINCKNEY.